United States Patent

[11] 3,580,998

[72] Inventors Robert A. Hammond
Canton;
Eugene A. Presta, Louisville, Ohio
[21] Appl. No. 784,619
[22] Filed Dec. 18, 1968
[45] Patented May 25, 1971
[73] Assignee Diebold Incorporated
Canton, Ohio

[54] VIDEO MULTIPLEXER-SWITCHER WITH SEQUENCE RECYCLING UPON LOSS OF VIDEO
5 Claims, 6 Drawing Figs.

[52] U.S. Cl. ........ 178/6.8
[51] Int. Cl. ........ H04n 7/02, H04n 7/08, H04n 7/18
[50] Field of Search ........ 178/6, 6 (PD), 6 (IND), 6 (TM), 6.8

[56] References Cited

UNITED STATES PATENTS 2,527,967 10/1950 Schrader ........ 178/6
3,417,198 12/1968 Loyd ........ 178/6.8
3,484,549 12/1969 Ricketts ........ 178/6

*Primary Examiner*—Bernard Konick
*Assistant Examiner*—Howard W. Britton
*Attorney*—Frease & Bishop

ABSTRACT: A plurality of television cameras such as in a closed circuit television system for industrial plant security are provided with a monitoring system including a control module and a plurality of switching modules, one for each camera, and also a single monitoring means such as a television receiver or a video tape recorder or both, at which signals or pictures from the cameras appear sequentially. The monitoring system includes means for enabling the picture from the cameras to be displayed at the monitor successively each for a selected desired length of time; or for enabling any camera to be removed in effect from the system by pressing a button; or for enabling any selected camera to remain connected to the monitor continuously or for any desired period of time merely by the operation of pushbuttons. Flexibility is provided in the system by utilizing monostable regenerative circuits in each video switching module to determine the length of time the corresponding camera remains operatively connected to the monitor and by successively triggering successive switching modules so that a system may be assembled with any desired number of cameras and switching modules. A bistable regenerative circuit is employed in the control module as a clock. Loss of synchronization between the cameras by the monitor is avoided by switching at electronic speeds.

INVENTORS
Robert A. Hammond
BY and Eugene A. Presta

Frease & Bishop
ATTORNEYS

INVENTORS
Robert A. Hammond
BY and Eugene A. Presta

Frease & Bishop
ATTORNEYS

INVENTORS
Robert A. Hammond
BY and Eugene A. Presta

Frease & Bishop
ATTORNEYS

INVENTORS
Robert A. Hammond
BY and Eugene A. Presta

Frease & Bishop
ATTORNEYS

Patented May 25, 1971 3,580,998

5 Sheets-Sheet 5

INVENTORS
Robert A. Hammond
BY and Eugene A. Presta

Frease & Bishop
ATTORNEYS

VIDEO MULTIPLEXER-SWITCHER WITH SEQUENCE RECYCLING UPON LOSS OF VIDEO

BACKGROUND OF THE INVENTION

1. Field of the Invention

The invention relates generally to an improved multiplexer switching system for a plurality of television cameras with a single display or video recording means at a given point. Although the invention is not limited thereto it is particularly useful in connection with industrial plant security systems having a large number of television cameras located, one at each of a plurality of surveillance stations, and a single closed circuit television receiver or video tape recorder or both for all of the cameras located at a central observation point such as a guard station. The invention is described primarily in connection with such use by way of example.

2. Description of the Prior Art

Prior video surveillance systems for industrial plants have used a monitor for each camera with the monitors observed in banks of from up to 16 or 24 monitors by one guard at a guard station. It is difficult for a single guard to watch all of the 16 to 24 monitors at one time. The guard may miss seeing something suspicious when initially occurring. When something unusual finally may be noted, the picture may have passed and the guard may not have a fix on the particular monitor and thus the camera location. As a result the guard tires in watching, and because of the human element, the system breaks down. It has been estimated that the guard only sees a particular location 10 to 15 percent of the time if he is actually scanning the monitors.

Attempts have been made to resolve this problem by feeding the multicamera output to one monitor using an electromechanical control to sequentially display the camera outputs in a fixed sequential cycle. The time of display of the picture from each camera in this system may be varied to be, for example, 1 to 2 seconds duration.

This attempt has not satisfied the need because one or more of the cameras cannot be eliminated from the group in the cycle, the complete cycle must be completed before repeating the view from any particular camera, and a particular camera cannot be selected instantly for continuous display. Further, with an electromechanical control device, the switching from camera to camera requires the monitor to adjust for differences between synchronizing pulses from different cameras, which causes rolling, diagonal lines, surges and picture on and off at the monitor.

Such prior control devices include multiposition rotary relays which have a fixed number of positions. Thus, with a 20 position relay and where, say, 12 cameras are used, the other eight positions must be blanked out. The only alternative is to install for each position blanked out, at very high cost, reset relays or other electromechanical components to compensate for each blanked out position.

SUMMARY OF THE INVENTION

An object of the invention is to enable a plant guard to observe what is happening at any of the stations under multi-TV-camera surveillance without requiring his eyes to flit from display to display as is required where there are a plurality of receivers, one for each camera, and to guard against the activity at some surveillance stations being overlooked by inability to give attention to all of the displays present in a multidisplay system.

Another object of the invention is to provide a flexible system which may be installed without reconstruction or rewiring in plants requiring different numbers of surveillance stations and which is readily adapted to any number of such stations, for example from two to sixteen or even more, although as a matter of economics the system ordinarily would not be employed in a plant requiring less than four stations, and duplicate systems would have certain advantages where more than sixteen to twenty surveillance stations are used. Further, the invention contemplates the ready adding or subtracting of stations to or from any installed system, without disturbing the remainder of the system.

A further object of the invention is to avoid loss of synchronization between cameras and the monitoring device when switching takes place from one camera to the next.

Still another object of the invention is to make the system readily selective as to the length of time each camera remains operatively connected, as to the sequence in which the cameras are viewed, and as to the group of cameras which are viewed from a system which is already installed (for example enabling a guard to concentrate at a particular time on certain surveillance stations which are of particular interest), and when desired obtaining a continuous display from any particular surveillance station.

Finally, it is an object of the invention to provide a multiplexer switching system for a plurality of television cameras which may be constructed as a compact control station unit of a control module and a plurality of switching modules, one for each camera; which system eliminates complicated equipment heretofore required; which achieves the indicated objectives simply, effectively and inexpensively, which overcomes difficulties heretofore present, and which solves problems and satisfies needs existing in the art.

These objectives and advantages are obtained by the multicamera, single-monitor, multiplexer-switcher control system for closed circuit television systems, the general nature of which may be stated as including a plurality of cameras; a control module; a plurality of similar plug-in switching modules, one for each camera; a monitor; closed circuit television components and circuitry connecting the cameras, modules and monitor to successively display in selected sequence the outputs of the cameras at the monitor; the dwell period per camera being continuously variable by master clock control for say from 1 to 6 seconds; a control for each camera that may be activated to permit the unit time interval that the output of the camera is displayed at the monitor to be reduced to such short duration that the camera "on" time is not effectively visible; any camera being capable at any time in the switching sequence of being switched on manually for an indefinite period of time determined by an operator at a control station equipped with a control unit containing the control and switching modules; the control module preferably containing clock means for multiplexing, a trigger and reset circuit and output circuits for the video; each switching module preferably containing a timing circuit for dwell and an analog gate for the camera controlled by the particular switching module; the switching modules being associated so that each is triggered by the output of the preceding and triggers the following module; and the control unit preferably having button actuators including a series of buttons one for each camera, any one of which when actuated places the particular associated camera in "on" position all of the time, a reset button which when actuated terminates the said camera "on" position and reverts to automatic cycle operation of the system, a second series of buttons one for each camera which when actuated places the particular associated camera in the cycle sequence, and an adjusting button to vary the dwell time for display of the output of each camera in the cycle sequence.

BRIEF DESCRIPTION OF THE DRAWINGS

A preferred embodiment of the invention — illustrative of the best mode in which applicants have contemplated applying the principles — is set forth in the following description and shown in the drawings and which is particularly and distinctly pointed out and set forth in the appended claims.

Like reference characters are utilized throughout the drawings to designate like parts.

Figure 6:
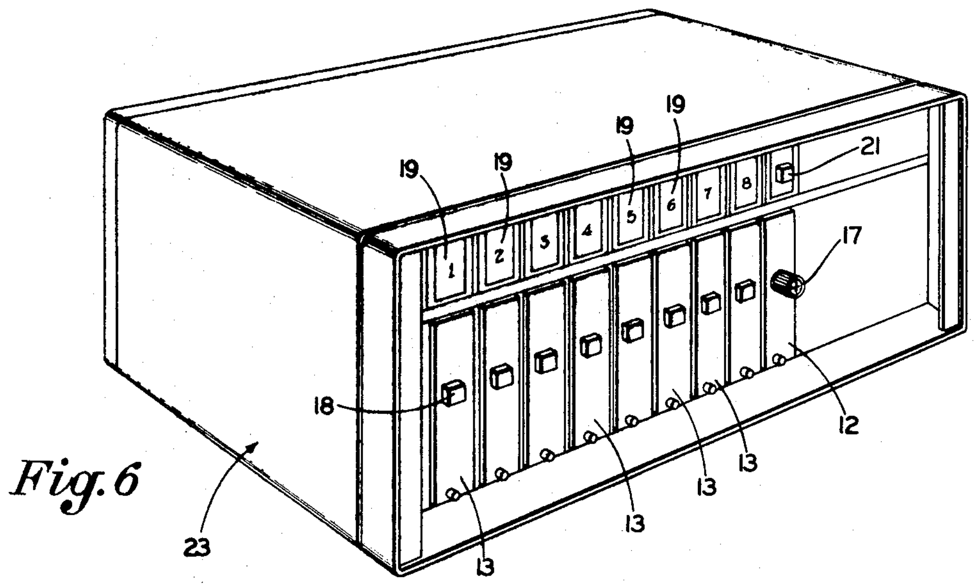
FIG. 6 is a perspective view of a control unit incorporating components of the multiplexer switching system.
Figure 1:
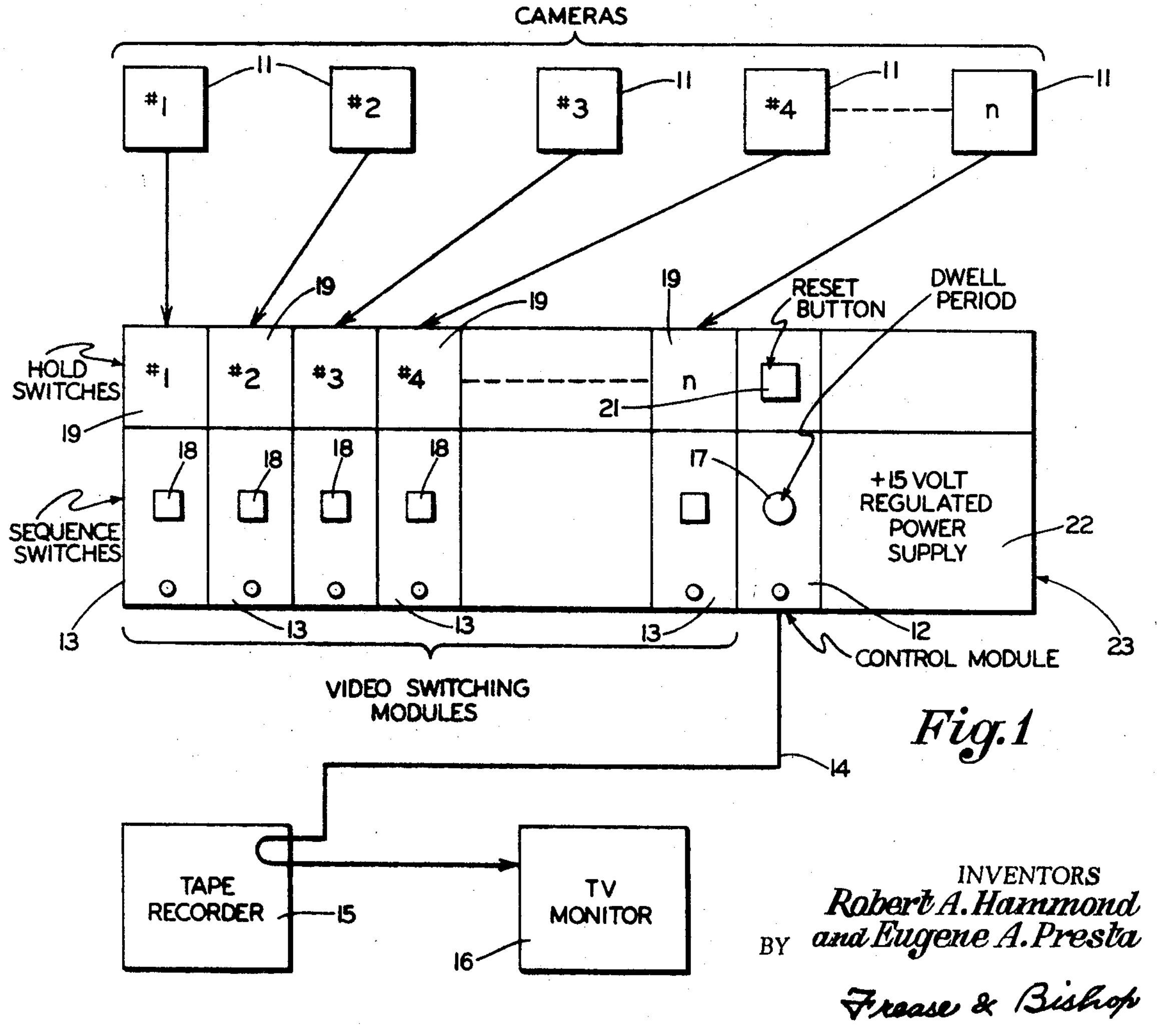
FIG. 1 is a block diagram representing the components of an illustrative system in accordance with the invention.

As represented symbolically in FIG. 1, for *n* cameras represented by rectangles 11, there are *n* switching modules represented by rectangles 13. A single control module 12 is provided for the switching modules 13. As will be explained more fully hereinafter, the control module 12 is arranged for triggering the video switching modules in sequence, each switching module triggering the next video module in order. Preferably the modules are plug-in type.

A circuit represented by a line 14 is provided for connection to a video tape recorder 15 or to a television monitor 16 in the form of a closed circuit television receiver with a viewing screen, providing a display or both the video tape recorder 15 and the TV monitor 16 may be utilized.

The control module 12 is provided with a control knob 17 for adjusting "dwell," or the length of time the display corresponding to each camera remains in the monitoring device 15 or 16. Moreover, each of the video switching modules 13 is provided with a pushbutton 18, for reducing the length of time that a signal from any camera remains on display so much that it is not visible to the human eye. Thus, that camera is effectively "blanked out" and eliminated from operation when desired for thus altering the sequence. Moreover, each of the switching modules 13 is provided with a hold switch 19 for selectively causing the corresponding camera to remain on display continuously when this is desired. The control module 12 is provided with a reset button 21 which when actuated restores normal cycle operation by releasing any hold switch 19 that has been actuated previously.

Preferably the modules are of the solid-state circuit type and are mounted together with a suitable power supply such as a 15-volt regulated power supply 22 in a common case or cabinet 23. Since the switching modules 13 are the modular type of unit provided with conventional electrical connectors which make contact when the module is inserted in cabinet 23, the sequence of operation may be altered also by removing modules from the case (with their camera connectors) and interchanging their position.

Figure 2:
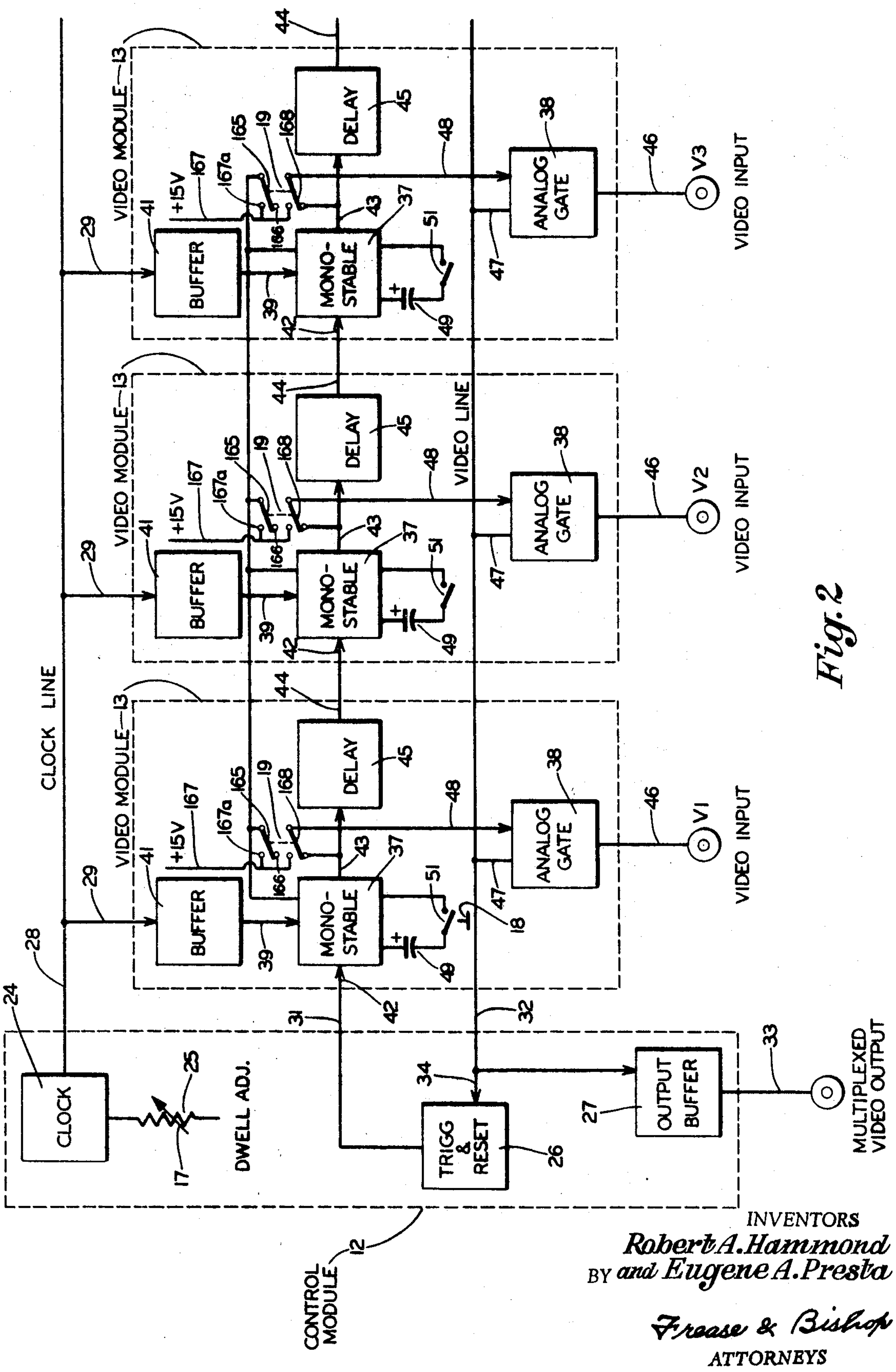
FIG. 2 is a fragmentary block diagram representing the components in the control module and in three of the video modules.

The elements of the modules 12 and 13 are shown in block diagram form in somewhat greater detail in FIG. 2, wherein only three of the video switching modules 13 are represented. The control module 12 includes a clock circuit 24 containing a schematically represented variable resistor 25 having a "dwell" adjusting knob 17, a trigger and reset circuit 26 and preferably an output buffer 27. There is an output clock line 28 connected to input clock lines 29 of the video switching modules 13. It will be understood that where the modular type of unit is employed, the mounting device, in this instance the case 23, is so wired and provided with connectors that such connections take place when the modules are inserted in place in the case 23.

From the control module 12 there is also an output trigger line 31 from the trigger and reset circuit 26, an input video line 32 and an output video line 33. The output buffer 27 is preferably interposed between the input and output video lines 32 and 33. There is also an input connection 34 to the trigger and reset circuit 26 from the input video line 32.

The video modules 13 each include a monostable regenerative circuit 37 and an analog gate 38. As will be explained in more detail hereinafter, the monostable regenerative circuits 37 are preferably of the solid-state flip-flop type. Each such monostable circuit has a synchronizing input line 39 from the input clock line 29 of the module, preferably with a buffer 41 interposed. The monostable circuits 37 also each have an input triggering line 42 constituting the input trigger line of the video switching module 13. Each of the monostable regenerative circuits 37 has an output line 43 operatively connected to an output triggering line 44 of the video switching module 13. Preferably a delay device 45 is interposed within each video switching module 13 between the output line 43 of the monostable regenerative circuit 37 and the output triggering line 44.

The delay device 45 is interposed between the lines 43 and 44 in order to provide clear separation between the successive displays from successive cameras in the system by insuring that the clock pulse is off and will not interfere with switching action.

The analog gate 38 is interposed between a video input line 46 of each video switching module 13 and a video output line 47 of the module. Each output line 47 is connected to the video output lines of the other switching modules 13 except in the case of the one adjacent to the control module 12, in which case video switching output line 47 is connected to the video input line 32 of the control module 12. The analog gate 38 also has an input control or gate-opening line 48 from the output line 43 of the monostable regenerative circuit 37.

The monostable regenerative circuit 37 is provided with an adjustable pulse-duration circuit including a capacitor 49 and a switch 51 having the pushbutton 18 for reducing the pulse duration to a very small value when it is desired to blank out the display for the corresponding one of the cameras.

The arrangement described avoids problems arising with electromechanical control where, in switching from camera to camera, the monitor has to adjust for differences between the synchronizing pulses from different cameras. This causes rolling and diagonal lines and surges and the picture going on and off.

Moreover, the arrangement described avoids the limitation of electromechanical control which necessarily has a multiposition rotary relay with a fixed number of positions. If such a rotary relay has 20 positions, for example, and it is desired to employ only 12 cameras, it would be necessary to allow the other eight positions to blank out, during a period of time in which the guard has no display, or to add reset relays or other electromechanical components to compensate, in addition to the extra installations and changes for each position added from 12 to 20.

In apparatus employing the invention the need for a coding and decoding circuitry in establishing the multiplexing sequence is avoided. The variable resistor 25 serves to control the time dwell for each camera for any selected interval, for example, between 1 and 6 seconds each.

A monostable regenerative circuit changes state for a fixed amount of time and then returns to its original state. The stable condition is the normal state and the astable condition is the one it holds for a fixed period of time unless sooner switched back. Fundamentally in the system according to the concepts of the invention there is a series of monostable flip-flops in place of the heretofore proposed bistable binary coder and decoder circuitry and components. The use of the monostable flip-flop instead of bistable flip-flop eliminates need for coder and decoder circuitry and components.

Figure 4:
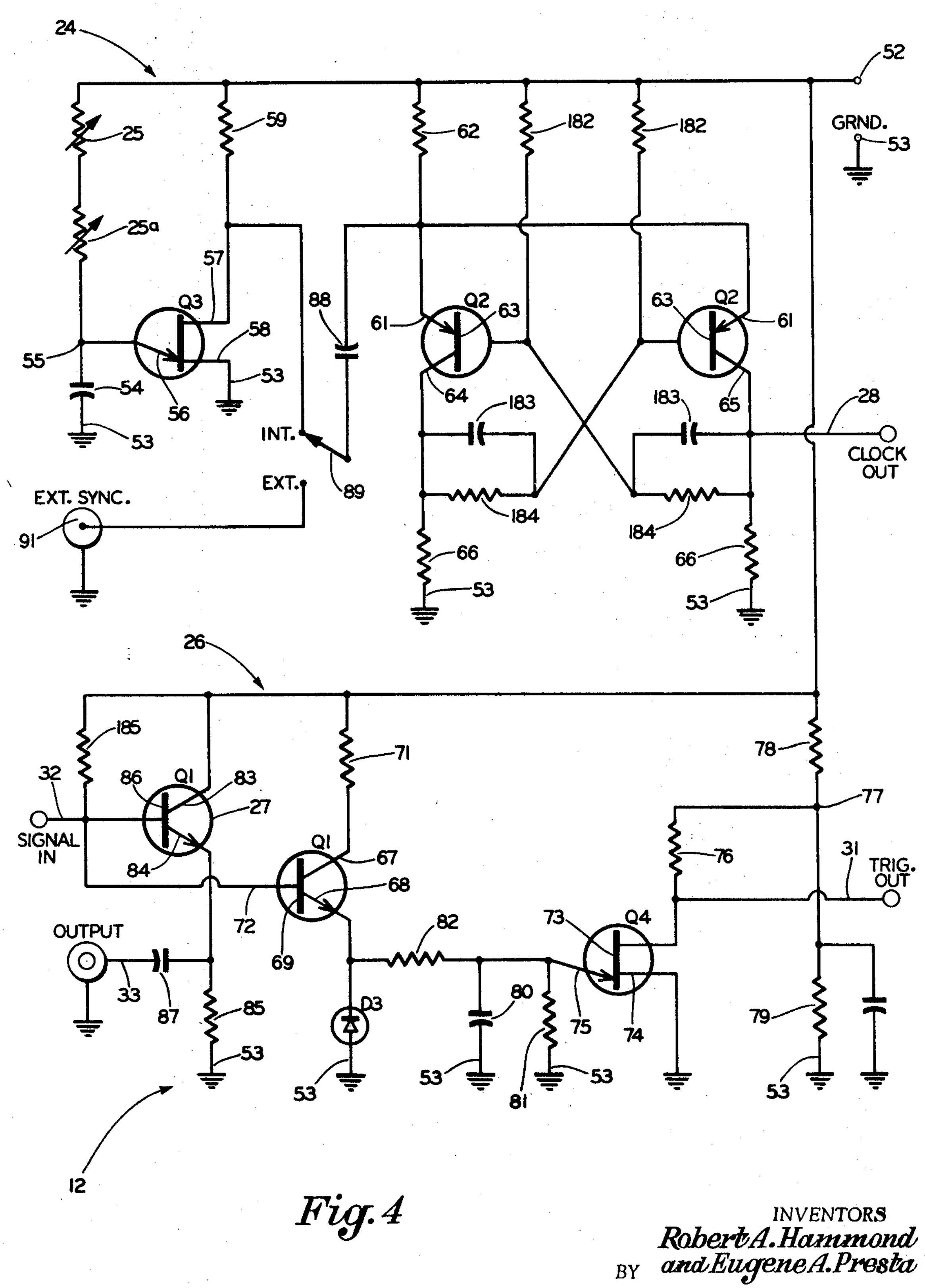
FIG. 4 is a circuit diagram of the control module.

As shown in FIG. 4, the clock circuit 24 in the control module 12 comprises a time base generator in the form of a relaxation oscillator utilizing a unijunction transistor Q3 and a bistable regenerative circuit shown as a flip-flop utilizing transistors Q2 which as shown are PNP. As shown, the circuits are energized by a suitable power supply which may be a 15-volt power supply having a positive terminal 52 and a ground, or negative connection to which connection is made in the plug-in module by means of plug-in terminals negative 53.

The time base generator includes in addition to the unijunction Q3, the variable dwell resistor 25 and a capacitor 54 connected in series between the positive power supply terminal 52 and the negative terminal 53 with a junction terminal 55. A second resistor 25*a* is connected in series with resistor 25 to correct for tolerances in the circuit components. The unijunction Q3 includes an emitter 56 connected to the junction terminal 55 of the resistor 25 and the capacitor 54, and base terminals 57 and 58. The terminal 57 is connected in series with a load resistor 59 to the positive power supply terminal 52, and the EB terminal 58 is connected to the negative terminal 53.

The flip-flop circuit is a conventional type of flip-flop circuit with emitters 61 connected through a load resistor 62 to the positive power supply terminal 52. The transistors Q2 have bases 63, which are resistance-capacity cross-coupled, and collectors 64 and 65, each connected to the negative terminal 53 through resistors 66. The collector 65 is connected to the output clock line 28.

The trigger and reset circuit 26 is formed by a transistor Q1 shown as an NPN transistor and a unijunction transistor Q4. The transistor Q1 has a collector 67, an emitter 68, and a base 69. The collector 67 is connected in series with a resistor 71 to the positive power supply terminal 52, and the emitter 68 is connected through a Zener diode D3 to the negative supply terminal 53. The base 69 is connected through a conductor 72 to the input video line 32.

The unijunction Q4 has a base terminal 73, an emitter-base terminal 74 and an emitter 75. The base terminal 73 is connected through a resistor 76 to a junction terminal 77 in a voltage divider composed of resistors 78 and 79, connected between the power supply terminals 52 and 53. A capacitor 80 and a resistor 81 are connected in parallel between the unijunction emitter 75 and the power supply ground terminal 53, and a resistor 82 is connected between the emitter 68 of the transistor Q1 and the unijunction emitter 75.

The buffer 27, shown as an NPN transistor is connected as an emitter follower. It has a collector 83 connected to the positive supply terminal 52, an emitter 84 connected through a load resistor 85 to the negative supply terminal 53 and a base 86 connected to the input video line 32. The emitter 84 is coupled to the output video line 33 through a capacitor 87 and the load resistor 85.

The adjustment of the variable resistor 25 determines the length of time required for the capacitor 54 to charge before it is discharged by the emitter-base circuit 56—58 of the unijunction Q3, thereby determining the dwell or time interval between impulses driving the bistable flip-flop Q2 of the clock circuit 24. As shown, the base connection 57 of the unijunction Q3 is coupled through a capacitor 88 to the emitters of the flip-flop Q2. If external synchronization should be desired this may be accomplished by providing a switch 89 and an external synchronization connector 91. It will be understood that the constants of the flip-flop circuit Q2 are so chosen as to provide pulses to the output clock line 28.

The trigger and reset circuit 26 consisting of the transistors Q1 and Q4 senses the absence of a video signal on the input video signal line 32 by the voltage level. When there is no such video signal, the voltage level rises for triggering the first video module to restart the sequence. This occurs because, when the voltage on the line 72 rises above the characteristic voltage of the Zener diode D3, it biases, forward biasing the transistor Q1 so that it conducts and charges the capacitor 80 in the emitter circuit of the unijunction Q4. When the charge on the capacitor 80 attains the firing potential of the diode formed by the terminals 75 and 74 of the unijunction Q4, a pulse is supplied through the output trigger line 31 to the trigger input of the first video module starting the switching cycle of the video switching modules.

The video signal from the input video signal line 32 is fed also into the emitter follower amplifier 27, acting as a buffer from the video output to the output video line 33. The buffer has a relatively low output impedance of the order of 7.5 ohms for example.

Each of the video modules comprises essentially a pair of cascaded monostable regenerative circuits such as flip-flop circuits 37 and 45 and an analog gate 38. The monostable regenerative circuit 37 comprises three transistors shown as NPN transistors 92, 93 and 94.

The transistors 92 and 93 have a collector terminal 95, connected through a resistor 96 to the positive power supply terminal 52, and grounded emitters. The transistor 93 has a base 97 connected through a resistor 98 to a terminal H1. The transistor 92 has a base 101 positively biased through a resistor 102, connected to the positive power supply terminal 52.

The transistor 94 has a collector 103 connected through a resistor 104 to the positive power supply terminal 52, an emitter 105 connected through a diode 106 with the negative power supply terminal 53, and a base 107, negatively biased through a resistor 108 and connected through a coupling resistor 109 to the collector terminal 95 of the transistors 92 and 93. The collector 103 of the transistor 94 is coupled through a capacitor 111 to the base 101 of the transistor 92. The capacitor 111 determines the time duration of the pulse of the monostable circuit 37; and for changing the time duration, the capacitor 49 is provided, which may be connected in parallel to the capacitor 111 by means of the pushbutton switch 18. The constants are so chosen that when the capacitor 111, alone, is in circuit the length of pulse is so short that a display does not remain long enough for the eye to observe the signal from the camera corresponding to the video switching module in question. However, when the switch 18 is closed to connect the capacitors 49 and 111 in parallel, the display remains for the entire dwell period determined by the control module 12.

The base 107 of the transistor 94 is biased negatively through a diode 112 and a resistor 113; and the base 101 is provided with a connection to the negative terminal 53 through a diode 114 and a resistor 115 having a common terminal 116 coupled through a capacitor 117 to the trigger input line 42.

The buffer 41 shown in the form of a PNP transistor is forward biased through a resistor 118 connected to the positive power supply terminal 52 and coupled through a capacitor 119 and a diode 112 to the base 107 of the transistor 94.

The analog gate 38 comprises a pair of transistors 121 and 122 shown as NPN transistors. The transistor 121, has a collector 123 connected to the positive power supply terminal 52, an emitter 124, and a base 125, connected to a point 126, on a voltage divider 127, 128 and coupled through a capacitor 129 to the input video line 46. The transistor 122 includes a collector 131 connected to the video signal output line 47, an emitter 132, and a base 133 connected, through a resistor 134 and a conductor 48, to the collector terminal 95 of the transistors 92 and 93. The emitters 124 and 132 are connected through a common adjustable resistor 135 to the negative terminal 53.

The collector terminal 95 of the transistors 92 and 93 is coupled through a capacitor 136 to the delay circuit 45. The delay circuit 45 as shown is also in the form of a monostable regenerative circuit including transistors 137, 138, and 139. The transistors 137, 138, and 139 are shown as being of the NPN type. The transistor 137 comprises a collector 141, an emitter 142, connected to the trigger output line 44, and a base 143. The emitter 142 is connected to the ground through a resistor 144. The transistor 138 comprises a collector 145 connected to the positive power supply terminal 52 through a resistor 146, a grounded emitter 147, and a base 148. The base 148 is connected to power positive power supply 52 through resistor 149. Diode 151 and resistor 152 function in the same manner as diode 112 and resistor 113. The junction terminal 153 of the diode 151 and the resistor 152 are coupled through the capacitor 136 and a line 154 to the collector terminal 95 of the transistors 92 and 93.

The transistor 139 comprises a collector 155, an emitter 156 and a base 157. The collector 155 is connected to the positive power supply terminal 52 through a resistor 158 and coupled through a delay capacitor 159 and the resistor 149 to the base 148 of the transistor 138. The base 157 of the transistor 139 in turn is coupled to the collector 145 of the transistor 138 through a resistor 161 and a resistor 162 forming with the resistor 146, a voltage dividing circuit across the power supply terminals 52 and 53. The emitter 156 of the transistor 139 is grounded through a diode 163.

The circuit constants are so chosen that the astable state of the monostable regenerative circuit 37 is about twice the longest clock period which may, for example, be 6 seconds. The sequence is adjusted by switching into the time constant of the monostable, the large capacitor 49, parallel to the small capacitor 111 by closing the switch 18. When the small capacitor 111 alone is in the time constant circuit, the astable time is approximately 100 microseconds. This short time is not visible to the eye on the monitor 16 (FIG. 1).

The second monostable circuit 45 provides a delay of the trigger pulse to the next succeeding video module. The circuit constants are so chosen as to provide a very short delay. The delay time is less than two horizontal lines on the monitor 16, and therefore, not visible to the observer.

The analog gate 38 as shown, is in the form of a common-collector amplifier, driving a common base saturating gate formed by transistors 121 and 122. The video signal applied to the base 125 is coupled to the video output line 47 when the monostable regenerative circuit 37 (transistors 92, 93, 94) is in the astable state.

As shown the video modules are identical and connected with the trigger output line of one applied to the trigger input line of the next module in sequence, so that the video switching modules trigger in sequence, each one triggering the succeeding module. When the last module has been triggered the voltage of the video line rises, triggering the reset in the control module 12 and restarting the cycle. The rise of voltage on the base 69 of the control module 12 (FIG. 4) initiates another cycle as previously explained in connection with the operation of the control module.

For explanation purposes it may be assumed that initially the monostable flip-flops are all in the stable state, in which transistors 92 and 138 are conducting. Because of the monostable regenerative circuits in the video switching modules are all in the stable state, the video line 32 is attempting to rise to plus 15 volts and no video signal is passed to the monitor 16 or the video tape recorder 15. The rising voltage on the video line 32 is sensed by the trigger and reset 26 in the control module 12.

The trigger circuit 26 provides a trigger pulse to the first video module monostable regenerative circuit 37. The circuit 37 thereupon switches to the astable state. The internal time constant when the capacitor 49 is in the circuit is approximately 12 seconds in the system described by way of example. During this time, the circuit 37 being in the astable state, video signals are supplied to the monitor 16 through the analog gate 38 from the first one of the cameras 11. The clock portion of the control module 12 is adjustable from 1 to 6 seconds by the dwell adjust knob 17 of the variable resistor 25. The output pulses from the clock 24 are fed to the clock line 28, which applies the clock signal to all of the video modules 13 simultaneously.

The clock signal is used through the line 29 and buffer 41 to interrupt the 12 second time constant of the monostable regenerative circuit 37 and return the circuit 37 to the stable state, removing camera No. 1 from the video line 32 and therefore from the monitor 16. The switching action of the circuit 37, going from the astable to the stable state, is sensed by the adjacent video module monostable circuit through the delay circuit 45; and the second video switching circuit thereupon switches to the astable state and turns on the second analog gate. The delay insures that the clock line is clear of pulses and will not interfere with the switching action of the monostable circuit in the second switching module. While the second analog gate is open, video information from camera No. 2 is applied to the monitor 16 or the tape recorder 15. The same action occurs in the second video module as did with the first video module and occurs successively in successive video modules, each time transferring the monitor to a subsequent camera in sequence.

However, when the last switching module in the system is triggered the sequential switching action ceases. After its analog gate closes there is no longer a video signal on the video input line 32 to the control module 12. The voltage of the video line again attempts to rise to 15 volts. The trigger 26, in the control module 12, again senses the rising voltage on the video line and triggers the monostable regenerative circuit 37 in the first video module, repeating the previous sequence.

Should one wish to remove a camera from the normal switching sequence, and establish a new sequence with one or more of the cameras omitted from effect, the 12 second time constant capacitor 49 is disconnected from its monostable circuit 37 in the corresponding video switching module or modules associated with the camera or cameras in question, by opening the switch 18 which is accomplished from the front panel as indicated in FIG. 1. By removing the capacitor 49 from the monostable circuit in question, the dwell period for the corresponding camera is made very short (approximately 100 microseconds); and therefore, it will not be seen on the monitor by the operator. One or more modules may be "removed" simultaneously; thereby affording the operator any combination of cameras in the sequence. The switches 18 preferably are push-push switches, so that it is only necessary to again actuate a switch button of any switch 18 to restore a camera to the cycle sequence which has been removed from the sequence by a first actuation of a switch 18.

Figure 5:
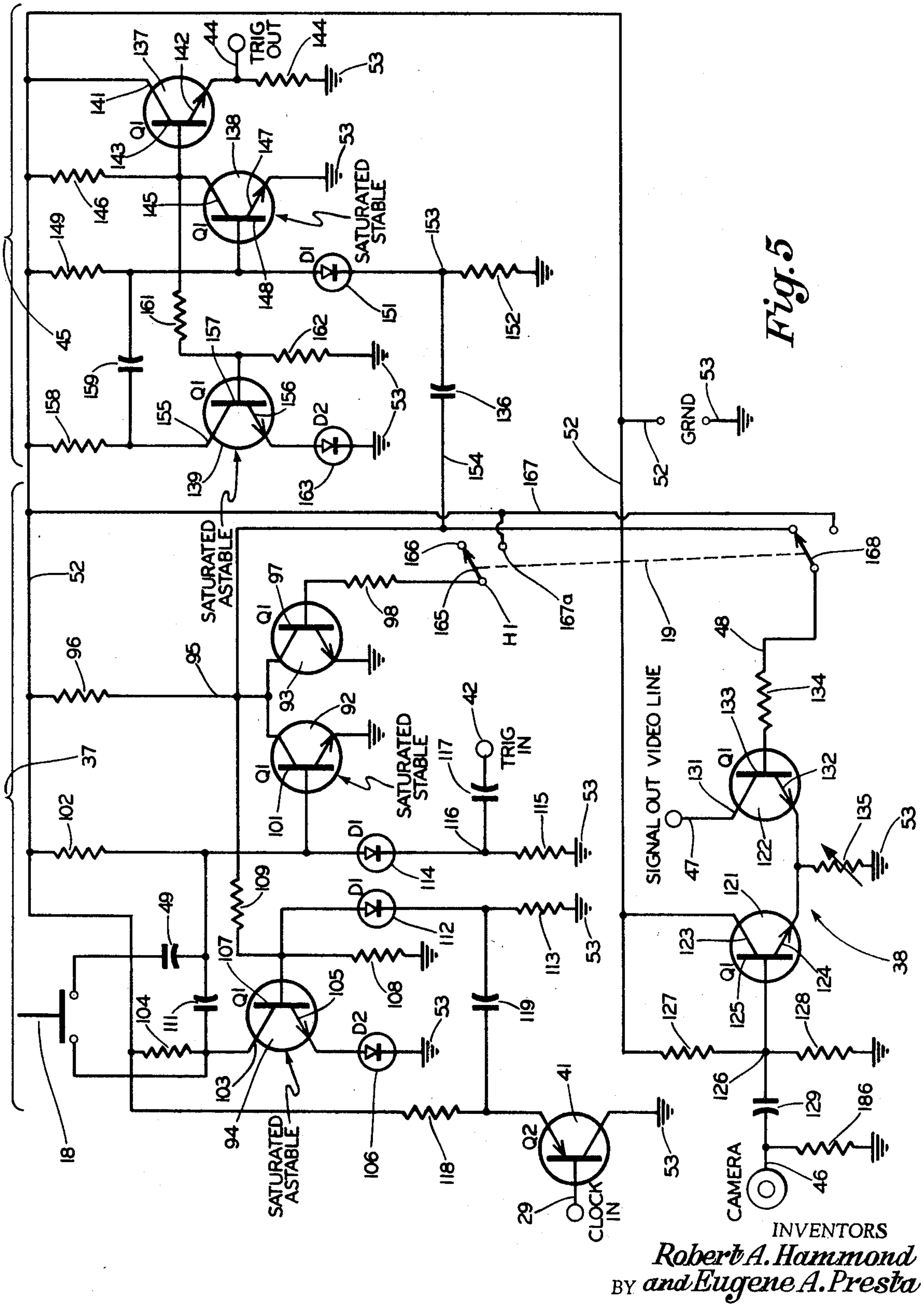
FIG. 5 is a circuit diagram of one of the video modules.

Because the sequential switching action does not have a fixed "reset," the number of video modules is not fixed, and any number of cameras may be used in the switching sequence. Provisions are also included to stop the automatic switching action and connect any one camera to the monitor 16 and the video tape recorder 15 for a duration established by the operator. This is accomplished, for example, by maintaining the transistor 93 in the monostable circuit 37 continuously in the stable state, for instance, by actuating a switch 165 (FIG. 5) to disconnect the base 97 of the transistor 93 from open terminal 166 and connecting it to the positive power supply terminal 52 through a conductor 167 and switch terminal **167*a*. The switch 165 is part of the ganghold switch 19 which includes also a switch 168 for disconnecting the line 48 of the analog gate 38 from the delay-circuit, coupling line 154 and connecting it through the line 167 to the positive power supply terminal 52**.

As indicated by the legends, the transistors 94 and 139 are saturated when in the astable state and the transistors 92 and 138 are saturated when in the stable state. When the power is first turned on, the transistors 92 and 138 in the stable state are saturated. A trigger input pulse at the trigger 42 switches the current so that the transistors 94 and 139 become saturated in the astable state causing the voltage to rise on the base 133 of the transistor 122 of the analog gate 38 so that the transistor 122 becomes saturated, allowing the video signal from the input video line 46 to feed the video line 47 and 32 through the transistors 121 and 122. A clock pulse through the buffer 41 turns off the transistor 94, turning the transistor 92 back on to resume the stable state. This in turn, turns the transistor 122 of the analog gate 38 off again.

The delay circuit 45 senses the state of the video switching module. When the module switches from astable to stable, the delay circuit 45 switches from stable to astable state.

Figure 3:
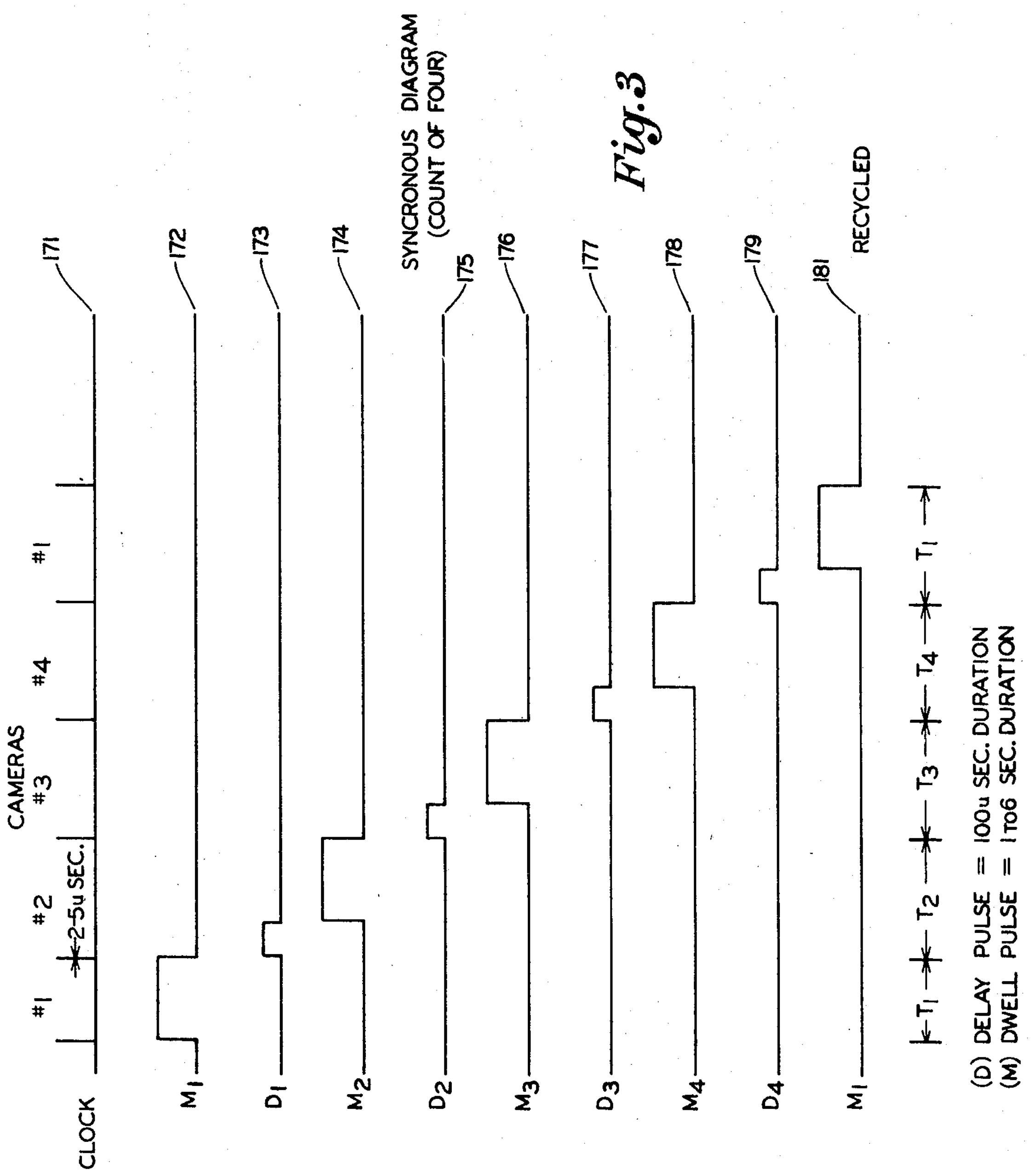
FIG. 3 is a graph in the form of a synchronous diagram illustrating the operation of the system in conjunction with the use of only four cameras by way of example.

The sequence of operation when four cameras and four switching modules are employed is shown in FIG. 3. Curve 171 shows a series of 2 to 5 microsecond clock pulses spaced, for example, 12 seconds according to the setting of the dwell control knob 17. The curve 172 represents the pulse produced at the collector terminal 95 and the line 154 of the monostable regenerative circuit 37 of the first video switching module 13 when the transistor 94 is saturated to the astable state. This pulse is converted by the differentiating circuit consisting of the capacitor 136 and the resistor 152 to positive and negative spikes for switching the delay circuit 45 to produce the delay pulse shown in curve 173 of FIG. 3. The delay pulse of curve 173 is long enough to prevent the next clock pulse of curve 171 from interfering with the triggering action of the next video switching circuit, which is triggered to produce the pulse shown in curve 174. Curves 175, 176 and 177, 178, and 179 show successive monostable and delay pulses, each beginning at the end of the preceding pulse. At the end of the last pulse, the fourth in this case, there being four units in this system, since there is not another video switching module with an analog gate therein to open the video line, the voltage on the video line rises causing the reset action of the unit 26 in the control module 12 to take place and the system recycles as represented by the curve 181, the first curve of a new cycle.

The invention is not limited to the use of particular dimensions of the electrical components or particular ratings of transistors. However, by way of example, values which have produced satisfactory results are as follows:

| | | |
|---|---|---|
| 1 | Variable resistor 25, 25a | 100,000 ohms. |
| 2 | Resistor 59 | 560 ohms. |
| 3 | Resistor 62 | 2,000 ohms. |
| 4 | Resistors 182 | 20,000 ohms. |
| 5 | Capacitor 54 | 10 microfarads. |
| 6 | Capacitor 88 | 100 mfd. |
| 7 | Capacitor 183 | 0.01 mfd. |
| 8 | Resistors 184 | 43,000 ohms. |
| 9 | Resistors 66 | 13,000 ohms. |
| 10 | Resistor 185 | 3,300 ohms. |
| 11 | Resistor 71 | 10,000 ohms. |
| 12 | Capacitor 87 | 1,000 mfd. |
| 13 | Resistor 85 | 750 ohms. |
| 14 | Resistor 82 | 15,000 ohms. |
| 15 | Resistor 71 | 10,000 ohms. |
| 16 | Capacitor 80 | 0.1 mfd. |
| 17 | Resistor 81 | 20,000 ohms. |
| 18 | Resistor 76 | 560 ohms. |
| 19 | Resistor 78 | 10,000 ohms. |
| 20 | Resistor 79 | 12,000 ohms. |
| 21 | Capacitor 156 | 100 mfd. |
| 22 | Transistors 83 and Q1 | Type MPS 6531 Motorola. |
| 23 | Transistor Q2 | Type 2N 1305. |
| 24 | Transistor Q3 | Type TIS .43. |
| 25 | Transistor Q4 | Type 2N 1671B. |
| 26 | Diode D3 | Type T1655. |
| 27 | Resistor 104 | 5,100 ohms. |
| 28 | Capacitor 49 | 100 mfd. |
| 29 | Capacitor 111 | 0.1 mfd. |
| 30 | Resistor 109 | 9,100 ohms. |
| 31 | Resistor 108 | 2,700 ohms. |
| 32 | Resistor 102 | 150,000 ohms. |
| 33 | Resistor 96 | 5,100 ohms. |
| 34 | Capacitor 119 | 0.001 mfd. |
| 35 | Resistors 113 and 115 | 57,000 ohms. |
| 36 | Capacitor 117 | 0.001 mfd. |
| 37 | Resistor 98 | 33,000 ohms. |
| 38 | Resistor 127 | 12,000 ohms. |
| 39 | Resistor 128 | 10,000 ohms. |
| 40 | Resistor 186 | 75 ohms. |
| 41 | Capacitor 129 | 100 mfd. |
| 42 | Resistor 135 | 1,500 ohms. |
| 43 | Resistor 134 | 33,000 ohms. |
| 44 | Resistor 98 | 33,000 ohms. |
| 45 | Resistor 158 | 5,100 ohms. |
| 46 | Capacitor 159 | 0.001 mfd. |
| 47 | Resistor 149 | 150,000 ohms. |
| 48 | Resistor 146 | 5,100 ohms. |
| 49 | Resistor 144 | 1,000 ohms. |
| 50 | Resistor 152 | 47,000 ohms. |
| 51 | Capacitor 136 | 0.001 mfd. |
| 52 | Resistor 162 | 2,700 ohms. |
| 53 | Resistor 161 | 9,100 ohms. |
| 54 | Transistors 94, 92, 97, 121, 122, 137, 138, 139. | Type Motorola MPS 6531. |
| 55 | Transistor 41 | Type 2N 1305. |
| 56 | Diodes 112, 114, 151 | Type 1N 914. |
| 57 | Diodes 106, 163 | Type 1N 2484. |

While the invention has been described as embodied in concrete form, and as operating in a specific manner in accordance with the provisions with the patent statutes, it should be understood that the invention is not limited thereto, since various modifications will suggest themselves to those skilled in the art without departing from the spirit of the invention.

Accordingly, the concepts of the invention provide for automatically multiplexing and manually switching video signals from a number of closed circuit television cameras into a single monitoring system using switching modules one for each camera and a control module by which pictures from the cameras are displayed sequentially each for a selected length of time, with the ability instantly to remove any camera in effect from the sequence as well as the ability to connect any camera in the sequence for continuous display at the monitor; provide a system which avoids all of the difficulties heretofore encountered with multimonitor surveillance systems for industrial plants as well as the difficulties encountered using electromechanical control devices for switching from camera to camera; provide a new system utilizing simplified, efficient and readily actuated electronic components and circuitry for instant control of the picture display at a single monitor by pushbutton operation at a control box by a guard responsible for maintaining surveillance; and provide an improved system which eliminates costly arrangements heretofore required, achieves the stated objectives, and solves longstanding problems that have existed in the art.

Having now described the features, discoveries and principles of the invention, the manner in which the improved system and its components are combined and function, the operation, use and characteristics of the new system, and the advantageous, new and useful results obtained; the new and useful devices, elements, components, arrangements, combinations and systems are set forth in the appended claims.

We claim:

1. A multiplex system for a plurality of closed circuit television cameras comprising in combination a clock circuit, a trigger circuit having a control terminal responsive to video signal level, a plurality of monostable regenerative pulse forming circuits, one for each of the television cameras to be employed, each monostable circuit having a synchronizing input connection from the clock circuit, a trigger input connection and an output terminal, the trigger input connection of one of said monostable circuits being connected to the said trigger circuit and the trigger input connections of the remaining monostable circuits each being operatively connected to the output terminal of the preceding monostable circuit, and a plurality of gates, each having an input terminal adapted to be connected to one of said television cameras, having a control terminal, and having an output terminal, said output terminals being connected to the control terminal of said trigger, each of said gates having its control terminal connected to the output terminal of one of said monostable regenerative circuits.

2. A system as described in claim 1, wherein a delay circuit is interposed between the output terminal of a monostable regenerative circuit and the input trigger connection of a succeeding monostable regenerative circuit.

3. A multiplex system for a plurality of closed circuit television cameras comprising in combination a plurality of monostable regenerative pulse-forming circuits, one for each of the television cameras to be employed; means for synchronizing the monostable circuits; means for successively triggering the monostable circuits from a preceding circuit; a plurality of gates, each having an input terminal adapted to be connected to one of said television cameras, having an output terminal, and having means for opening the gate in response to triggering of one of said monostable circuits; a common video signal line connected to the output terminals of all of said gates for connection to video signal monitoring means; the elements being mounted on modules comprising in combination:

1. A control module having
   - a. An output clock line for synchronizing,
   - b. An output trigger line,
   - c. An input video signal line and
   - d. An output video line,
2. A plurality of video switching modules, each having
   - a. An input clock line connected to the output clock line of the control module,
   - b. An input trigger line, connected to the output trigger line of the control module,
   - c. An output trigger line,
   - d. A video signal output line connected to the output video line of the control module,
   - e. A video signal input line for connection to a television camera,
   - f. A gate interposed between the video signal lines of the video switching module and
   - g. Means responsive to the trigger lines and the clock line for opening said gate, said gate being adapted to be opened in response to signals received jointly from the input clock line and the input trigger line of the video switching module, and the input trigger line of one of said video switching modules being connected to the output trigger line of the control module, and the input trigger line of the other video switching modules, each being connected to the output trigger line of another of said modules, and
3. A television monitoring means connected to the output video line of the control module;

and a connection provided in at least one of the video modules for selectively reducing the length of time that the gate is open to a value rendering the video signal on the video monitoring means invisible and effectively eliminating the camera corresponding to said video module from the system.

4. A multiplex system for a plurality of closed circuit television cameras comprising in combination a plurality of monostable regenerative pulse-forming circuits, one for each of the television cameras to be employed; means for synchronizing the monostable circuits; means for successively triggering the monostable circuits from a preceding circuit; a plurality of gates, each having an input terminal adapted to be connected to one of said television cameras, having an output terminal, and having means for opening the gate in response to triggering of one of said monostable circuits; a common video signal line connected to the output terminals of all of said gates for connection to video signal monitoring means; the elements being mounted on modules comprising in combination:

1. A control module having
   a. An output clock line for synchronizing,
   b. An output trigger line,
   c. An input video signal line and
   d. An output video line,
2. A plurality of video switching modules, each having
   a. An input clock line connected to the output clock line of the control module,
   b. An input trigger line, connected to the output trigger line of the control module,
   c. An output trigger line,
   d. A video signal output line connected to the output video line of the control module,
   e. A video signal input line for connection to a television camera,
   f. A gate interposed between the video signal lines of the video switching module and
   g. Means responsive to the trigger lines and the clock line for opening said gate, said gate being adapted to be opened in response to signals received jointly from the input clock line and the input trigger line of the video switching module, and the input trigger line of one of said video switching modules being connected to the output trigger line of the control module, and the input trigger line of the other video switching modules, each being connected to the output trigger line of another of said modules, and
3. A television monitoring means connected to the output video line of the control module;

and at least one of switching modules being provided with a connection for preventing passage of the trigger signal to the subsequent switching module and thereby maintaining the camera corresponding to said switching module effectively connected to the television monitoring means continuously.

5. A multiplex system for a plurality of closed circuit television cameras comprising in combination a plurality of monostable regenerative pulse-forming circuits, one for each of the television cameras to be employed; means for synchronizing the monostable circuits; means for successively triggering the monostable circuits from a preceding circuit; a plurality of gates, each having an input terminal adapted to be connected to one of said television cameras, having an output terminal, and having means for opening the gate in response to triggering of one of said monostable circuits; a common video signal line connected to the output terminals of all of said gates for connection to video signal monitoring means; the elements being mounted on modules comprising in combination:

1. A control module having
   a. An output clock line for synchronizing,
   b. An output trigger line,
   c. An input video signal line and
   d. An output video line,
2. A plurality of video switching modules, each having
   a. An input clock line connected to the output clock line of the control module,
   b. An input trigger line, connected to the output trigger line of the control module,
   c. An output trigger line,
   d. A video signal output line connected to the output video line of the control module,
   e. A video signal input line for connection to a television camera,
   f. A gate interposed between the video signal lines of the video switching module and
   g. Means responsive to the trigger lines and the clock line for opening said gate, said gate being adapted to be opened in response to signals received jointly from the input clock line and the input trigger line of the video switching module, and the input trigger line of one of said video switching modules being connected to the output trigger line of the control module, and the input trigger line of the other video switching modules, each being connected to the output trigger line of another of said modules, and
3. A television monitoring means connected to the output video line of the control module;

the control module also including a trigger and reset circuit having an input terminal connected to the input video line of the control module and an output terminal connected to the output trigger line of the control module.